April 23, 1940.　　　B. L. QUARNSTROM　　　2,198,415

LOCK SEAM TUBING

Filed July 29, 1938

INVENTOR.
Bert L. Quarnstrom
BY
ATTORNEYS

Patented Apr. 23, 1940

2,198,415

UNITED STATES PATENT OFFICE 2,198,415

LOCK SEAM TUBING

Bert L. Quarnstrom, Detroit, Mich., assignor to Bundy Tubing Company, Detroit, Mich., a corporation of Michigan Application July 29, 1938, Serial No. 222,038

1 Claim. (Cl. 138—74)

This invention relates to lock seam tubing.

Lock seam tubing is tubing made from strip stock fashioned into hollow cross-sectional form with a single ply wall, and with the edges of the stock reversely bent upon themselves and interlocked with each other. This tubing is admirably suited for certain uses, as, for example, in radiators for automobiles or other heat exchange devices, or in other places where the requirements are not particularly high. Usually the interlocked edges are secured together by a sealing metal such as soft solder of relatively low melting point, although the edges may be secured together by high melting point hard solder such as brazing material or the like. In some instances the edges may be merely locked together and not sealed with sealing metal.

The disadvantage of such tube is the fact that the overlapping edges form a longitudinally running projection or rib usually on the interior of the tube. Heretofore the thickness of this rib has been equal to four thicknesses of the stock used to make the tube. It will readily be appreciated that when each edge is reversely bent upon itself and then the edges interlocked with each other, that the result is a rib constituted by four thicknesses of the stock. Such a rib decreases the interior area of the tube and requires excess metal. The decreasing of the area of the tube becomes important particularly where small tubing is used, as, for example, tubing of one-quarter inch outside diameter.

The present invention resides particularly in the provision of an improved lock seam wherein a seam of the lock type is employed the strength of which is at least equal to that of the lock seam heretofore used but wherein the thickness of the resultant rib is reduced and less stock used. A structure for carrying out the invention is shown in the accompanying drawing.

Figure 1:
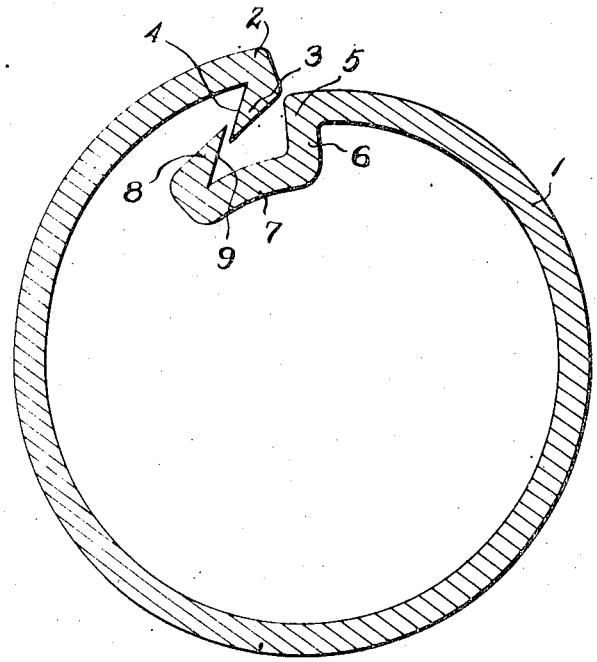
Fig. 1 is a cross-sectional view of strip stock with the edges shaped and about to be interlocked with each other.

The manner of forming such a tube from strip stock by a tube mill is well known to those versed in the art and it is unnecessary to go into this phase of the situation. Suffice it to say that the strip stock, which may be of any suitable metal, is fashioned into hollow cross-sectional form, thus providing the tube 1 illustrated in the drawing. One edge 2 of the stock is fashioned with a reverse bend forming a hook or U structure, and the extreme end forming one side of the U as illustrated at 3, is beveled as at 4. The other edge 5 of the stock is formed with a radially inwardly extending part 6, and a circumferentially extending part 7, and the extreme end is bent upon itself to form a hook or U structure, the extreme end being illustrated at 8 and beveled at 9. The edges may be thus formed as the strip is moving and prior to the fashioning of the stock into tubular form, and then interfitted as the tubular shape is attained. As pointed out, both the edges may be sealed with soft solder or hard solder, or otherwise brazed or attached to each other, or for some uses the tube may be used without sealing the seam. Of course, so far as this invention is concerned, various kinds of stock may be used, such as bare steel, copper-coated steel, copper, cuprous metals in general, or other metals.

Figure 2:
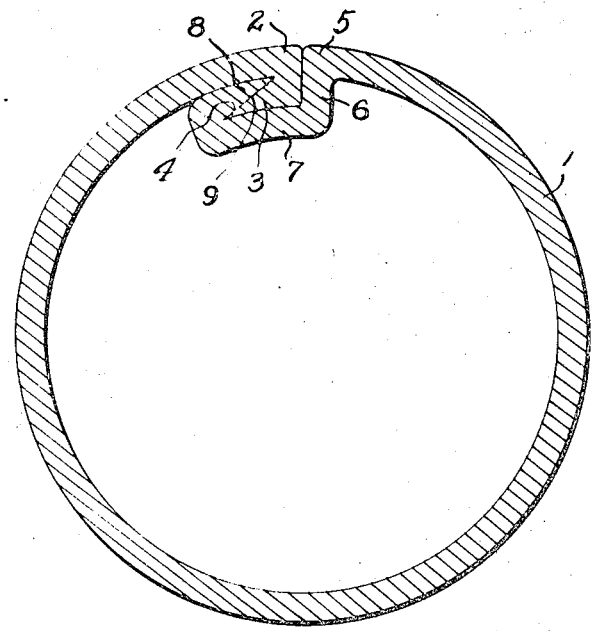
Fig. 2 is a cross-sectional view of a tube with the edges interlocked.

By reference to Fig. 2 it will be noted that the internal rib formed by the lock seam has a thickness equal to only three plies of stock, one ply being constituted by the part 7, another ply constituted by the interfitted beveled edges 3 and 8, and the third ply being constituted by the stock adjacent the edge 2. Heretofore the extreme edges 3 and 8 were not beveled but were overlapped with each other, with the result that these two parts themselves formed a body having a thickness equal to twice the thickness of the stock, and then, of course, when the part 7 and the stock adjacent the end 2 are added to this, the rib structure is four plies thick. The new structure forms a lock seam fully equal in strength to the old type and a saving is made in the amount of stock used. This saving perhaps appears to be slight, but when one appreciates that tube of this type is used in tremendous quantities this slight saving adds up to a material amount. In addition, the interior area of the tube is not interfered with to so great an extent because the thickness of the rib formed by the seam is reduced. This is important in heat exchange devices and particularly so where small size tube is used.

I claim:

A tube comprising strip metal stock fashioned into hollow cross-sectional form, one edge of the stock having a reverse bend providing substantially a formation of U shape, the extreme edge which constitutes one leg of the U being beveled, another edge of the stock being offset relative to the stock which forms the wall of the tube and having a reverse bend providing substantially a formation of U shape, the extreme edge which constitutes one leg of the U being beveled, said edges being disposed in an interlocking seam with the beveled faces of the extreme edges in contiguous relation substantially throughout their length, said seam having a thickness substantially equal to three plies of the strip stock and the beveled extreme edges constituting one ply of the seam.

BERT L. QUARNSTROM.